US011870221B2

(12) United States Patent
Walker, Jr.

(10) Patent No.: US 11,870,221 B2
(45) Date of Patent: Jan. 9, 2024

(54) SPARK PLUG AND METHODS OF MANUFACTURING SAME

(71) Applicant: FEDERAL-MOGUL IGNITION LLC, Southfield, MI (US)

(72) Inventor: William J. Walker, Jr., Ann Arbor, MI (US)

(73) Assignee: FEDERAL-MOGUL IGNITION LLC, Southfield, MI (US)

( * ) Notice: Subject to any disclaimer, the term of this patent is extended or adjusted under 35 U.S.C. 154(b) by 0 days.

(21) Appl. No.: 17/947,419

(22) Filed: Sep. 19, 2022

(65) Prior Publication Data

US 2023/0116256 A1 Apr. 13, 2023

Related U.S. Application Data

(60) Provisional application No. 63/250,653, filed on Sep. 30, 2021.

(51) Int. Cl.

| | |
|---|---|
| ***H01T 13/22*** | (2006.01) |
| ***H01T 13/38*** | (2006.01) |
| ***H01T 21/02*** | (2006.01) |
| ***H01T 13/08*** | (2006.01) |

(52) U.S. Cl.
CPC ............. *H01T 13/38* (2013.01); *H01T 13/08* (2013.01); *H01T 13/22* (2013.01); *H01T 21/02* (2013.01)

(58) Field of Classification Search
CPC ......... H01T 13/38; H01T 13/08; H01T 13/22; H01T 21/02
USPC ........................................................ 313/141
See application file for complete search history.

(56) References Cited

U.S. PATENT DOCUMENTS

| | | | |
|---|---|---|---|
| 4,452,072 A | 6/1984 | Damson et al. | |
| 5,682,082 A | 10/1997 | Wei et al. | |
| 6,265,816 B1 | 7/2001 | Ito et al. | |
| 6,407,487 B1 | 6/2002 | Sugimoto | |
| 6,552,476 B1 * | 4/2003 | Hanashi | H01T 13/20 313/142 |
| 7,169,723 B2 | 1/2007 | Walker, Jr. | |

(Continued)

FOREIGN PATENT DOCUMENTS

| | | |
|---|---|---|
| CN | 203312623 U | 11/2013 |
| CN | 102856792 B | 3/2014 |

(Continued)

OTHER PUBLICATIONS

W.J. Walker Jr.; Polyethylene Glycol Binders for Advanced Ceramics; Union Carbide Chemicals and Plastics Co.. Inc.; Ceram. Eng. SCi. Proc 14[11-12] pp. 58-79(1993).

*Primary Examiner* — Christopher M Raabe
(74) *Attorney, Agent, or Firm* — REISING ETHINGTON, P.C.

(57) ABSTRACT

A spark plug and method of manufacturing, where the spark plug meets particular geometric relationships to maintain and potentially improve dielectric performance while downsizing other plug dimensions. The spark plug includes an insulator that can withstand higher voltages while having areas with a reduced cross-sectional thickness. In some embodiments, the insulator has a dielectric strength of 42 kV/mm or more with a radial thickness at the internal seal of 1.5 to 1.6 mm, inclusive, and a radial thickness at a gasket of 0.6 to 0.9 mm, inclusive.

20 Claims, 5 Drawing Sheets

(56) References Cited

U.S. PATENT DOCUMENTS

| | | | | |
|---|---|---|---|---|
| 7,250,711 | B2 * | 7/2007 | Koyama | H01T 13/20<br>313/142 |
| 7,456,122 | B2 | 11/2008 | Rhodes et al. | |
| 7,598,661 | B2 | 10/2009 | Walker, Jr. | |
| 8,278,809 | B2 | 10/2012 | Kurono et al. | |
| 8,482,187 | B2 | 7/2013 | Takaoka et al. | |
| 8,564,184 | B2 | 10/2013 | Kurono et al. | |
| 8,614,542 | B2 | 12/2013 | Walker et al. | |
| 9,302,942 | B2 | 4/2016 | Imada | |
| 9,583,916 | B2 | 2/2017 | Imada et al. | |
| 9,912,125 | B2 | 3/2018 | Yoshida et al. | |
| 10,348,061 | B2 | 7/2019 | Yamada et al. | |
| 10,586,627 | B2 | 3/2020 | Yoshida et al. | |
| 10,637,212 | B2 | 4/2020 | Uegaki et al. | |
| 2006/0186780 | A1 | 8/2006 | Ogata et al. | |
| 2010/0007260 | A1 | 1/2010 | Niessner | |
| 2013/0147339 | A1 * | 6/2013 | Burrows | H01T 13/20<br>313/143 |
| 2015/0333487 | A1 * | 11/2015 | Katsuraya | H01T 13/20<br>313/142 |
| 2020/0112146 | A1 | 4/2020 | Yokoyama et al. | |
| 2022/0028334 | A1 * | 1/2022 | Park | G09G 3/3266 |

FOREIGN PATENT DOCUMENTS

| | | | | |
|---|---|---|---|---|
| CN | 104488150 | A * | 4/2015 | H01B 3/12 |
| EP | 1276190 | A1 | 1/2003 | |
| EP | 2118973 | B1 | 5/2010 | |
| JP | 6242259 | B2 | 12/2017 | |
| JP | 6521897 | B2 | 5/2019 | |

* cited by examiner

| | PA1 | | PA2 | PA3 | EX1 | EX2 | | PA4 | PA5 | PA6 | EX3 | EX4 | EX5 | EX6 | EX7 | | EX8 |
|---|---|---|---|---|---|---|---|---|---|---|---|---|---|---|---|---|---|
| **$D_M$** | **14** | | **12** | **12** | **12** | **12** | | **10** | **10** | **10** | **10** | **10** | **10** | **10** | **9** | | **8** |
| **$D_S$** | **3.91** | | **3.05** | **3.3** | **3.05** | **3.3** | | **3.05** | **3.05** | **3.05** | **3.05** | **3.05** | **3.9** | **3.05** | **3.05** | | **3.05** |
| **$D_{CE}$** | **2.76** | | **1.65** | **1.9** | **1.65** | **1.9** | | **2.22** | **1.65** | **1.65** | **2.22** | **1.65** | **1.65** | **1.65** | **1.65** | | **1.65** |
| | | | | | | | | | | | | | | | | | |
| **$T_{IS}$** | **2.62** | | **2.11** | **2.23** | **2.26** | **1.55** | | **1.52** | **1.63** | **1.63** | **1.52** | **1.63** | **1.20** | **1.43** | **1.31** | | **1.00** |
| **$T_G$** | **2.00** | | **1.84** | **1.70** | **2.21** | **1.10** | | **1.17** | **1.68** | **1.70** | **1.17** | **1.70** | **1.70** | **1.70** | **1.45** | | **1.20** |
| | | | | | | | | | | | | | | | | | |
| $(T_{IS}*D_S)/(D_{CE}*D_M)$ | 0.265 | | 0.325 | 0.322 | 0.347 | 0.224 | | 0.209 | 0.300 | 0.300 | 0.209 | 0.300 | 0.284 | 0.263 | 0.269 | | 0.230 |
| $(T_G*D_S)/(D_{CE}*D_M)$ | 0.203 | | 0.284 | 0.246 | 0.340 | 0.159 | | 0.161 | 0.310 | 0.314 | 0.161 | 0.314 | 0.402 | 0.314 | 0.297 | | 0.276 |
| | | | | | | | | | | | | | | | | | |
| $\rho$ | 3.78 | | 3.78 | 3.78 | 3.96 | 3.96 | | 3.78 | 3.88 | 3.78 | 3.96 | 3.96 | 3.96 | 3.96 | 3.96 | | 3.96 |
| | | | | | | | | | | | | | | | | | |
| $A=(3.98/(3.98-\rho))^{0.5}$ | 4.46 | | 4.46 | 4.46 | 14.11 | 14.11 | | 4.46 | 6.31 | 4.46 | 14.11 | 14.11 | 14.11 | 14.11 | 14.11 | | 14.11 |
| | | | | | | | | | | | | | | | | | |
| **F1** | **1.18** | | **1.45** | **1.44** | **4.90** | **3.16** | | **0.93** | **1.90** | **1.34** | **2.95** | **4.24** | **4.00** | **3.72** | **3.80** | | **3.24** |
| **F2** | **0.90** | | **1.27** | **1.10** | **4.79** | **2.25** | | **0.72** | **1.95** | **1.40** | **2.27** | **4.43** | **5.67** | **4.43** | **4.19** | | **3.90** |

FIG. 5

SPARK PLUG AND METHODS OF MANUFACTURING SAME

CROSS-REFERENCE TO RELATED APPLICATION

This application claims the benefit of U.S. Provisional Application No. 63/250,653 filed Sep. 30, 2021, the entire contents of which is hereby incorporated by reference.

FIELD

This disclosure generally relates to spark plugs, and more particularly, to spark plug insulators and methods of manufacture.

BACKGROUND

The electrical and mechanical requirements for spark plugs have been increasing and continue to increase. For example, some automotive specifications now require a voltage of 45 kV for an M12 spark plug. With further improvement in engine technology, voltage requirements are expected to increase further while the size of spark plugs decrease, for example, to M10. Therefore, there is a need for ceramic materials spark plug insulators that can withstand higher voltages while having thinner cross sections.

SUMMARY

In accordance with one embodiment, there is a spark plug comprising a shell having a thread area and an axial bore. The spark plug includes an insulator having a ceramic body and an axial bore, the insulator being disposed at least partially within the axial bore of the shell and the ceramic body being made from a ceramic material. The spark plug includes a gasket disposed at least partially within the axial bore of the insulator, and an internal seal disposed at least partially within the axial bore of the insulator. The spark plug includes a center electrode disposed at least partially within the axial bore of the insulator, and a ground electrode configured to create a spark gap with the center electrode. Further, $$\left(\frac{T_{IS}}{D_{CE}}\right)\left(\frac{D_S}{D_M}\right)\left(\frac{\rho_{TH}}{\rho_{TH}-\rho}\right)^{0.5} > 2$$

or $$\left(\frac{T_G}{D_{CE}}\right)\left(\frac{D_S}{D_M}\right)\left(\frac{\rho_{TH}}{\rho_{TH}-\rho}\right)^{0.5} > 2$$

where $T_{IS}$ is a radial thickness of the insulator at the internal seal, $D_{CE}$ is a diameter of the center electrode, Ds is a diameter of the internal seal, $D_M$ is a major diameter at the thread area of the shell, $\rho_{TH}$ is a density of the ceramic material that is fully dense and pore-free, $\rho$ is a density of the ceramic material, and $T_G$ is a radial thickness of the insulator at the gasket.

In some embodiments, the insulator has a dielectric strength of 42 kV/mm or more and the radial thickness of the insulator at the internal seal is 1.5 to 2.26 mm, inclusive.

In some embodiments, a reduction in the radial thickness of the insulator at the internal seal corresponds to a proportional thickness increase in a thickness of the shell at the thread area or a proportional diametric increase in a diameter of the center electrode or a diameter of the internal seal, and the proportional thickness increase or the proportional diametric increase is 20-30%.

In some embodiments, the radial thickness of the insulator at the internal seal is 1.5 to 1.6 mm, inclusive.

In some embodiments, the major diameter is M10, the insulator has a dielectric strength of 42 kV/mm or more and the radial thickness of the insulator at the gasket is 0.6 to 1.7 mm, inclusive.

In some embodiments, a reduction in the radial thickness of the insulator at the gasket corresponds to a proportional thickness increase in a thickness of the shell at the thread area or a proportional diametric increase in a diameter of the center electrode or a diameter of the internal seal, and the proportional thickness increase or the proportional diametric increase is 20-30%.

In some embodiments, the radial thickness of the insulator at the gasket is 0.6 to 0.9 mm, inclusive.

In some embodiments, the radial thickness of the insulator at the internal seal is 1.5 to 1.6 mm, inclusive, and/or the radial thickness of the insulator at the gasket is 0.6 to 0.9 mm, inclusive.

In some embodiments, the ceramic body has a single-phase crystal structure of alpha-alumina grains.

In some embodiments, the ceramic body has less than 1% porosity by volume.

In some embodiments, the ceramic body has a uniform average grain size that is less than 10 microns.

In some embodiments, the ceramic body has a uniform average grain size that is less than 5 microns.

In some embodiments, the ceramic body includes greater than 99.8 wt % alumina.

In some embodiments, the alumina of the ceramic body is derived from an alkoxide precursor alumina powder having a purity of at least 99.95 wt %.

In some embodiments, $$\left(\frac{T_{IS}}{D_{CE}}\right)\left(\frac{D_S}{D_M}\right)\left(\frac{\rho_{TH}}{\rho_{TH}-\rho}\right)^{0.5} > 2$$

and $$\left(\frac{T_G}{D_{CE}}\right)\left(\frac{D_S}{D_M}\right)\left(\frac{\rho_{TH}}{\rho_{TH}-\rho}\right)^{0.5} > 2.$$

In some embodiments, $$\left(\frac{T_{IS}}{D_{CE}}\right)\left(\frac{D_S}{D_M}\right)\left(\frac{\rho_{TH}}{\rho_{TH}-\rho}\right)^{0.5} > 3$$

and $$\left(\frac{T_G}{D_{CE}}\right)\left(\frac{D_S}{D_M}\right)\left(\frac{\rho_{TH}}{\rho_{TH}-\rho}\right)^{0.5} > 3.$$

In some embodiments, there is a method of manufacturing the spark plug, comprising the step of injection molding the ceramic body.

In some embodiments, the method comprises the steps of spray drying a slurry to form a granular material and pressing the granular material to form the ceramic body.

In accordance with one embodiment, there is provided a spark plug having a shell with an axial bore, with the shell having an M12 major diameter at a thread area of the shell. The spark plug includes an insulator with a ceramic body, the insulator having an axial bore and being disposed at least partially within the axial bore of the shell. The spark plug further includes an internal seal being disposed at least partially within the axial bore of the insulator, a center electrode being disposed at least partially within the axial bore of the insulator, and a ground electrode configured to create a spark gap with the center electrode. The insulator is configured to have a dielectric strength of 42 kV/mm or more and a radial thickness at the internal seal of 1.5 to 1.6 mm, inclusive.

In accordance with another embodiment, there is provided a spark plug having a shell with an axial bore, with the shell having an M10 major diameter at a thread area of the shell. The spark plug includes an insulator with a ceramic body, the insulator having an axial bore and being disposed at least partially within the axial bore of the shell. The spark plug further includes a gasket being disposed at least partially within the axial bore of the shell, a center electrode being disposed at least partially within the axial bore of the insulator, and a ground electrode configured to create a spark gap with the center electrode. The insulator is configured to have a dielectric strength of 42 kV/mm or more and a radial thickness at the gasket of 0.6 to 0.9 mm, inclusive.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DRAWINGS

Preferred example embodiments will hereinafter be described in conjunction with the appended drawings, wherein like designations denote like elements, and wherein.

Figure 1:
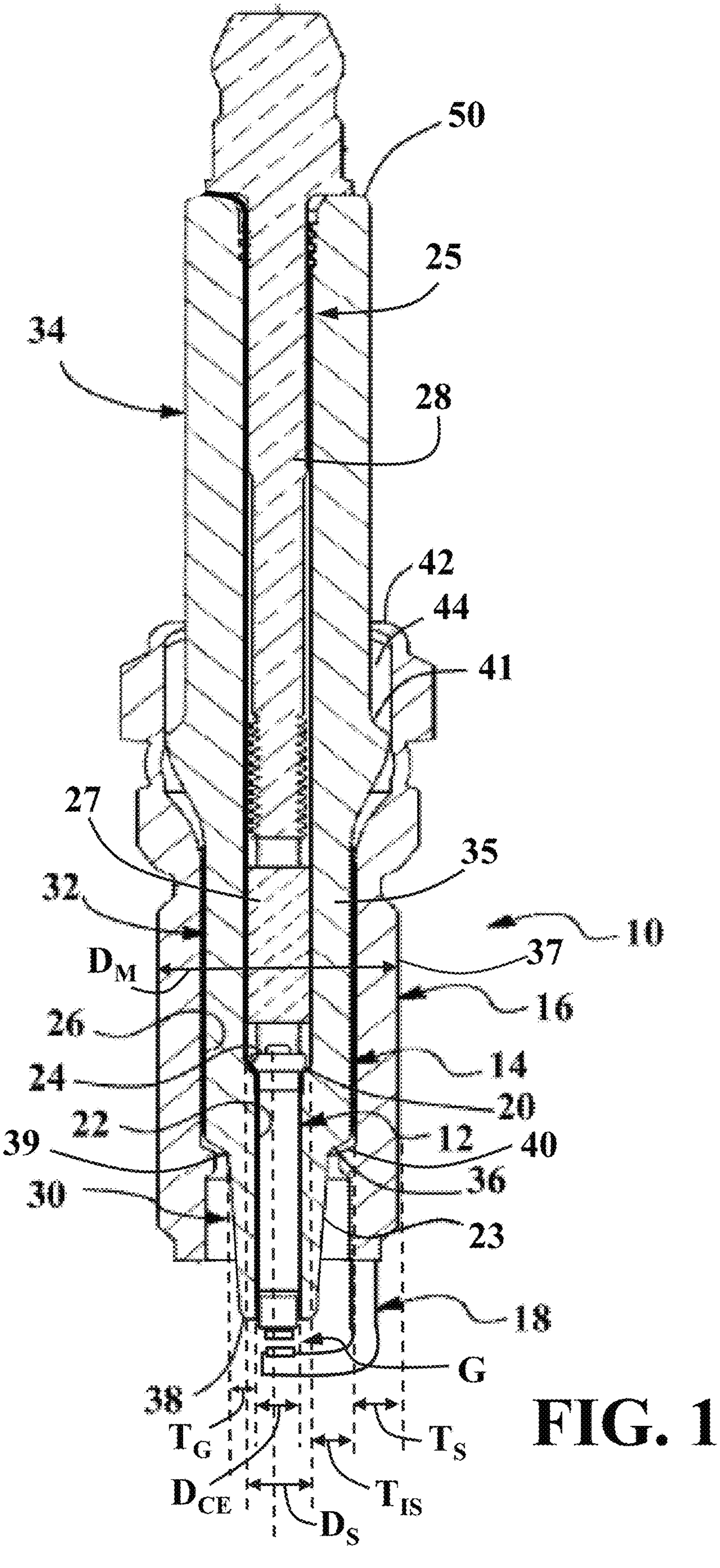
FIG. 1 is a cross-sectional view of a spark plug according to one embodiment.
Figure 2:
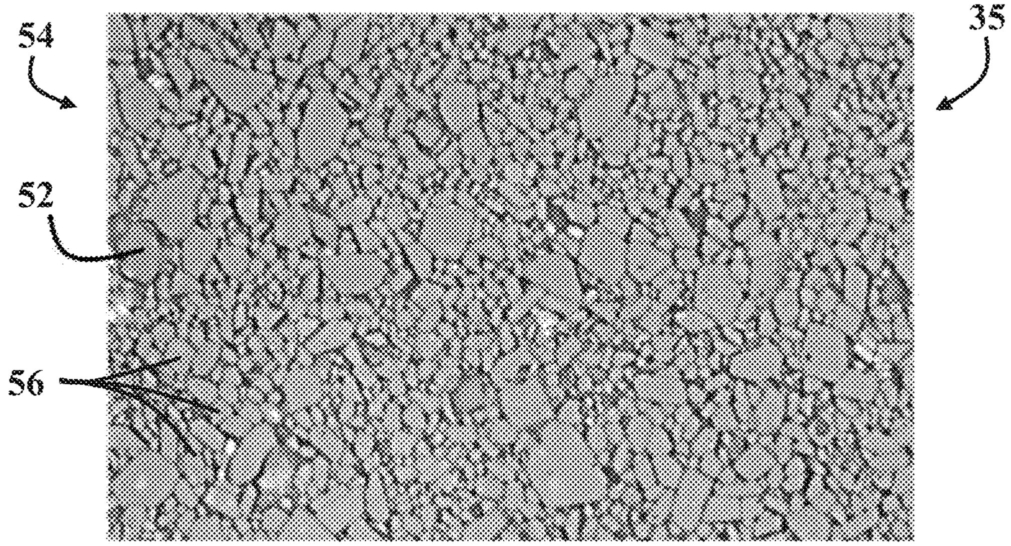
FIG. 2 is a micrograph of the ceramic body of the spark plug insulator of FIG. 1.
Figure 3:
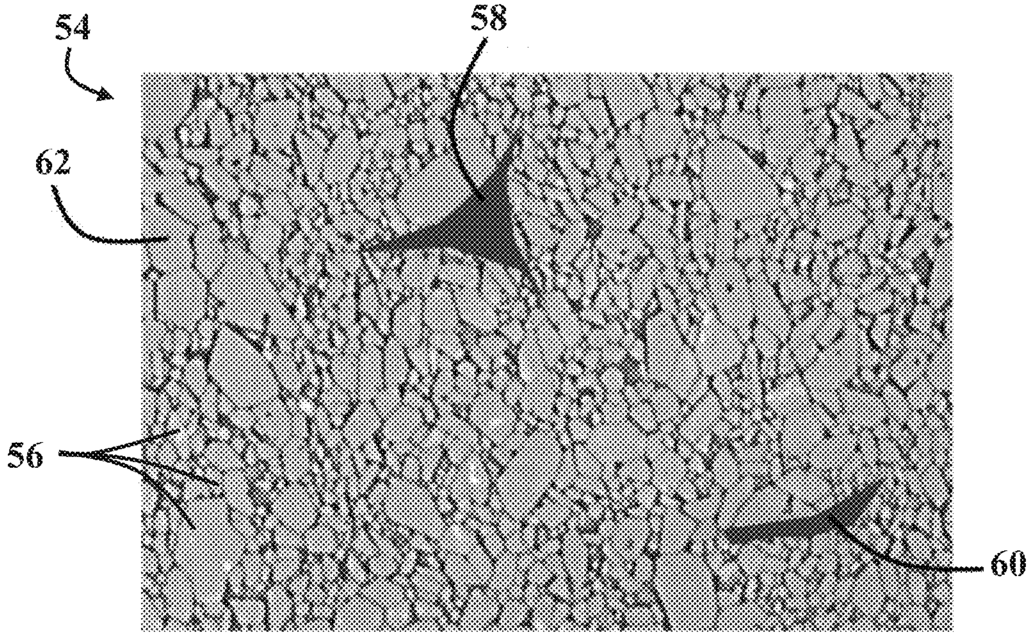
FIG. 3 (prior art)
Figure 4:
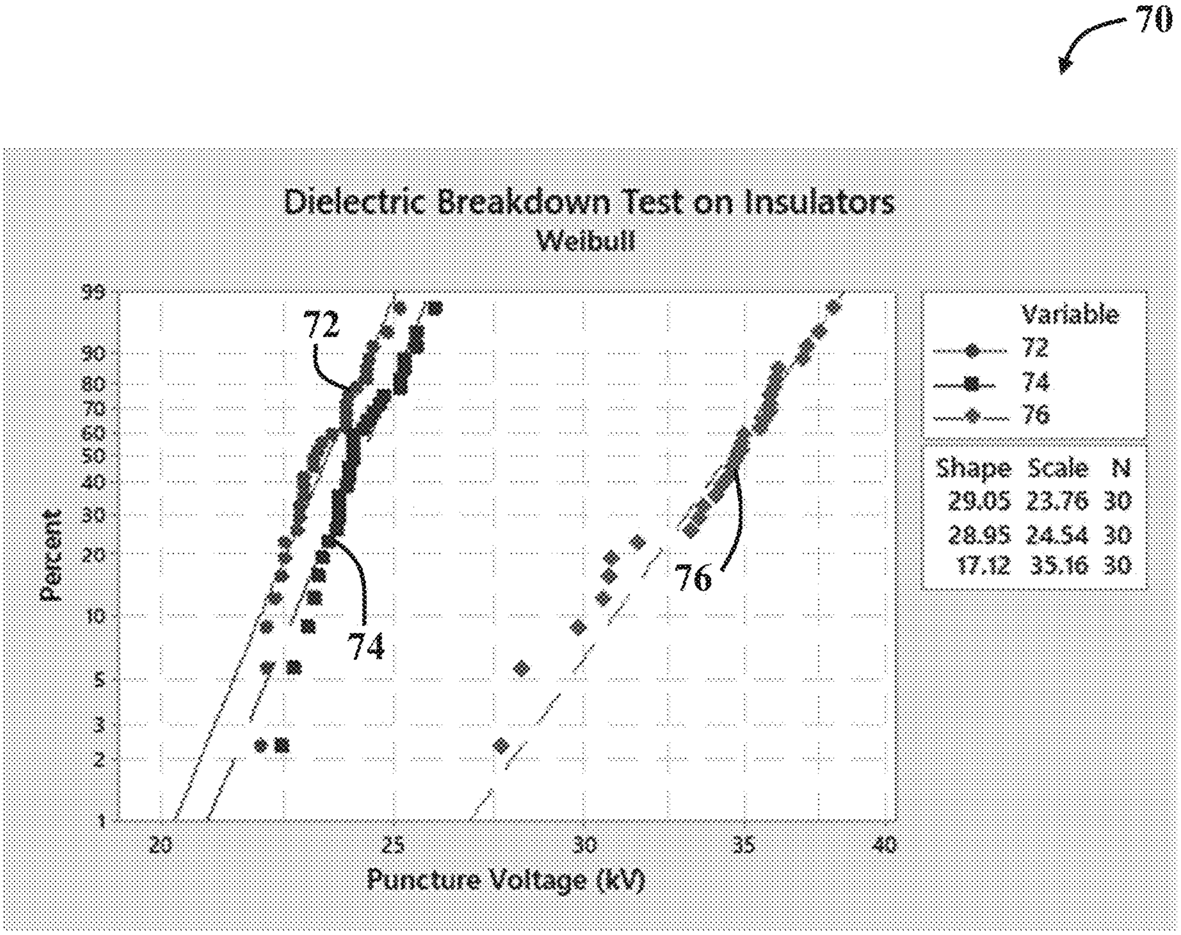
Figure 6:
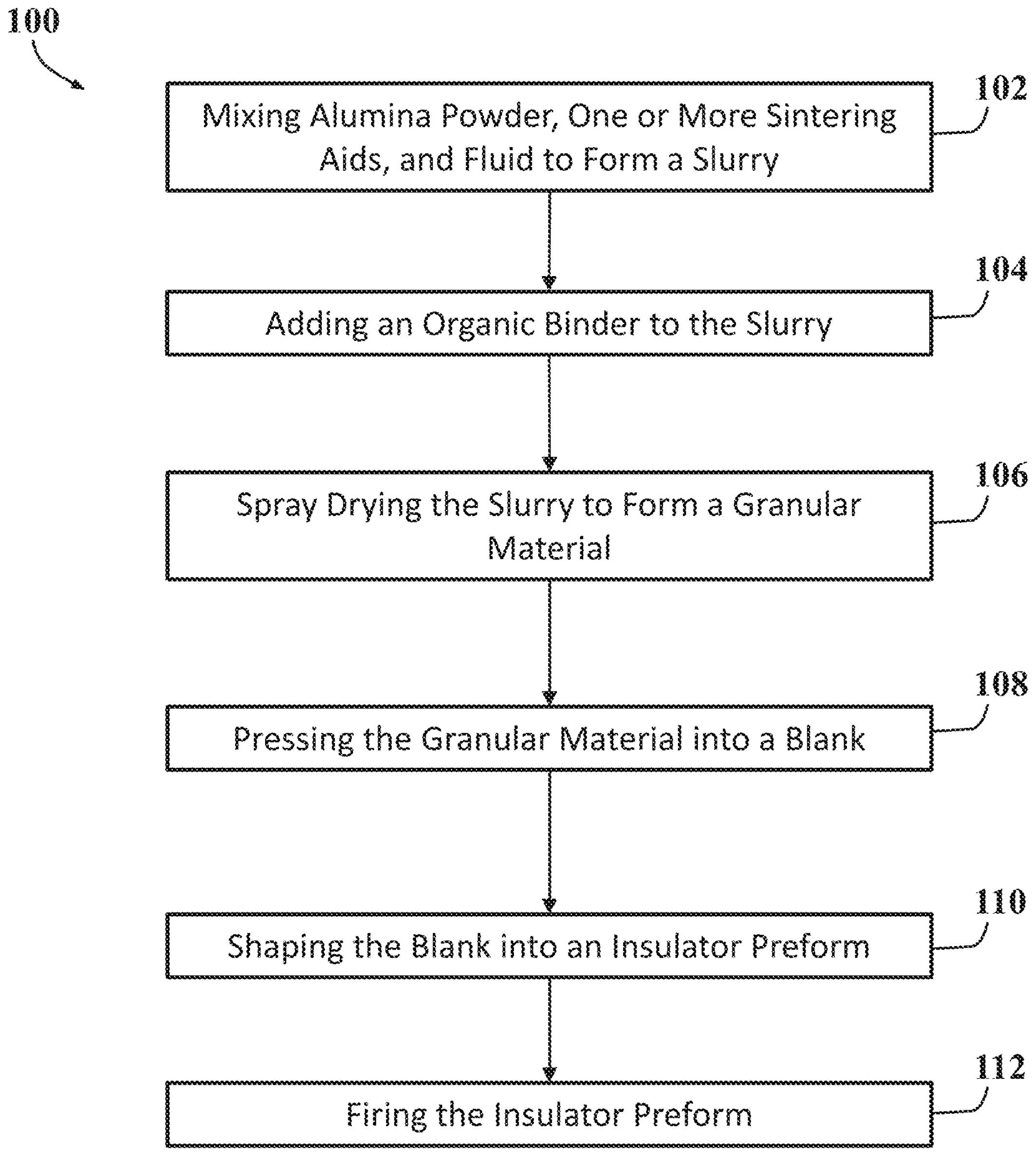

FIG. 3 schematically illustrates a relic and pore of the prior art microstructure;

FIG. 4 is a plot showing dielectric performance of various insulators;

FIG. 5 is a table showing a comparison between six example prior art plugs (PA1-6) and eight example embodiments in accordance with the teachings herein (EX1-8); and FIG. 6 is a flowchart illustrating an example method of manufacture for the insulator and ceramic body of FIGS. 1 and 2.

DESCRIPTION

The spark plug insulators described herein include a high purity alumina ceramic body that is virtually pore free and has a dielectric strength that is about 30% higher than current insulators. This allows for the insulator to be constructed with a thinner cross section, which is needed for smaller plugs (e.g., M10 versus M12), and may be used to proportionally increase the thickness of other components of the spark plug, such as the shell, internal seal, center electrode, etc. Using conventional processing methods, the high purity alumina materials described herein can be prone to large (e.g., 50 to 250 micron) crescent-shaped voids from poor consolidation of spray dried granules. These crescent-shaped voids can limit both the dielectric strength and the mechanical strength of the insulator. Accordingly, in some embodiments, the insulators are specially injection molded or spray dried with particular additives and binders to enhance the microstructure of the insulator.

FIG. 1 illustrates an example spark plug 10. The spark plug 10 includes a center electrode 12, an insulator 14, a metallic shell 16, and a ground electrode 18. The illustrated spark plug 10 is a J-gap spark plug having a spark gap G between the center electrode 12 and the ground electrode 18, and is advantageously used in high-performance automotive applications. However, it should be appreciated that the insulators and methods described herein may be used with any type of spark plug or ignition device, including glow plugs, industrial plugs, aviation igniters and/or any other device that is used to ignite an air/fuel mixture in an engine.

The center electrode 12, which can be a single unitary component or can include a number of separate components, is at least partially disposed or located within an axial bore 22 that extends along the axial length of the insulator 14. As illustrated, the axial bore 22 includes one or more internal step portions 24 that circumferentially extend around the inside of the bore and are designed to receive complementary external step portions 20 of the center electrode 12. In the embodiment of FIG. 1, the axial bore 22 only includes a single internal step or shoulder portion 24; however, it is possible for the axial bore to include additional internal step portions at different axial positions along the length of the bore. The insulator 14 is at least partially disposed within an internal bore 26 of the metallic shell 16, and the internal bore 26 extends along the length of the metallic shell and is generally coaxial with the axial bore 22. In the particular embodiment shown, a tip end 38 of the insulator 14 extends from and protrudes beyond the end of the metallic shell internal bore 26, and a tip end of the center electrode 12 extends from and protrudes beyond the insulator axial bore 22. The tip end of the center electrode 12 forms a spark gap G with a corresponding portion of the ground electrode 18; this may include embodiments with or without precious metal firing elements on the center electrode and/or the ground electrode. In the FIG. 1 embodiment, both the center and ground electrodes 12, 18 have precious metal firing elements attached thereto, but the disclosed spark plug arrangement is simply provided as an example and is not required.

The insulator 14 is an elongated and generally cylindrical component that is made from an electrically insulating material and is designed to isolate the center electrode 12 from the metallic shell 16 so that high-voltage ignition pulses in the center electrode are directed to the spark gap G. This can occur via a center wire assembly 25, which includes the center electrode 12, an internal seal 27, and a terminal electrode 28. The center wire assembly 25 is at least partially surrounded by the axial bore 22 of the insulator 14. Various shielding thickness can be measured at points along the length of the insulator 14, and the thicknesses herein are measured as the radial distance between the axial bore 22 and an outer surface 23 of the insulator, as will be detailed further below. Along its length, the insulator 14 includes a nose portion 30, an intermediate portion 32, and a terminal portion 34. The insulator 14 comprises a ceramic body 35 that has a reduced thickness and increased dielectric strength, as compared with similar materials not manufactured in accordance with the teachings herein. Other configurations or embodiments are certainly possible, beyond those illustrated in the figures, and will likely be at least partially dictated by the desired application for the spark plug 10. For example, the insulator 14 could have a dual barrel design, various internal wells or grooves, just to cite a few examples.

The nose portion 30 extends in the axial or longitudinal direction between an external step 36 on the outer surface 23 of the insulator and a distal end 38 located at a tip of the insulator 14 at the firing end of the plug 10. The concave end of the external step 36 forms a gasket shoulder 39, which is the radially innermost portion of the external step. The external step 36 and gasket shoulder 39 rest against the gasket 40 that is located between the insulator 14 and the shell 16. The outer surface 23 of the insulator 14 may include other structural features not shown in FIG. 1 such as an annular rib to limit or prevent carbon fouling and other build-up. The nose portion 30 may have a continuous and uniform taper along its axial extent, or it could have sections of differing taper or no taper at all (i.e., straight sections where the outer surfaces are parallel to one another). Moreover, the extent to which the nose portion 30 axially extends or protrudes beyond the end of the metallic shell 16 (sometimes referred to as the "projection"), may be greater or less than that shown in FIG. 1. In some cases, it is even possible for the distal end or tip 38 of the nose portion to be retracted within the insulator bore 22 so that it does not extend beyond metallic shell at all (i.e., a negative reach).

The intermediate portion 32 of the insulator extends in the axial direction between an external locking feature 41 and the external step 36 described above. In the particular embodiment illustrated in FIG. 1, the majority of the intermediate portion 32 is located and retained within the internal bore 26 of the metallic shell 16 and serves to surround the internal seal 27. The external locking feature 41 may have a diametrically-enlarged shape so that during a spark plug assembly process, an open end or flange 42 of the metallic shell can be folded over or otherwise mechanically deformed in order to securely retain the insulator 14 in place. The folded flange 42 also traps an annular seal 44 in between an exterior surface of the insulator 14 and an interior surface of the metallic shell 16 so that a certain amount of sealing is achieved. In another embodiment, the annular seal 44 can be omitted so that the folded flange 42 is in direct contact with the external locking feature 41. Other intermediate portion features are certainly possible as well.

The terminal portion 34 is at the opposite end of the insulator 14 as the nose portion 30 and it extends in the axial direction between the external locking feature 41 and a second distal end or terminal end 50. In the illustrated embodiment, the terminal portion 34 is quite long, however, it may be shorter and/or have any number of other features, like annular ribs. During operation, the terminal portion 34 is generally situated outside of the combustion chamber of the engine.

The ceramic body 35 is advantageously made of a high purity alumina material. The high purity alumina material, according to one embodiment, is greater than or equal to 99.8 wt % aluminum oxide ($Al_2O_3$), with small amounts of one or more sintering aids making up the balance (e.g., magnesium oxide (MgO), yttrium oxide ($Y_2O_3$), and/or zirconium oxide ($ZrO_2$)). Other alumina-based or ceramic material may be possible, but advantageously, the alumina powder used to make the ceramic body 35 is an alkoxide derived alumina with a purity of at least 99.93 wt % aluminum oxide or more preferably at least 99.97 wt % aluminum oxide. Typically, this type of material is less robust during manufacture, and resulted in processing defects that could limit performance of the insulator, particularly when subjected to conventional processing methods. However, as detailed below, the microstructure and dielectric strength can be strategically enhanced through particular manufacturing methods, thereby permitting the creation of more thin-walled structures for the ceramic body 35.

FIG. 2 is a micrograph of the ceramic body 35, showing a microstructure 52. The microstructure 52, when made with the high purity alumina in accordance with the manufacturing methods herein, includes a single-phase crystal structure 54 of alpha-alumina grains 56 (only a few of which are labeled for clarity purposes). The microstructure 52 is virtually pore free and has a density that is greater than 98% of its theoretical density, and more preferably, greater than 99% of its theoretical density. This equates to less than 1% by volume in porosity. Advantageously, the alpha-alumina grains 56 have a uniform grain size of less than 10 microns, and preferably less than 5 microns. Having larger grains, as is typical with conventional processing methods with high purity alumina, is oftentimes unsuitable for insulators because they reduce the mechanical strength and thermal shock resistance to an unacceptable level.

FIG. 3 shows a prior art ceramic body, which, despite having alpha-alumina grains 56, includes a schematically illustrated relic 58 and crescent-shaped void 60 in the microstructure 62. Using conventional processing can impart undesirable relics 58 and voids 60 in the microstructure 62. The high purity alumina material is particularly prone to large (e.g., 50 micron to 250 micron) crescent-shaped voids 60 from poor consolidation of spray dried granules. These crescent-shaped voids 60 limited both the dielectric strength and the mechanical strength of the ceramic body. Accordingly, the manufacturing methods described herein can be used to impart the requisite strength and microstructure needed to create a more thin-walled structure for the insulator 14.

Returning to FIG. 1, the thicknesses of various components of the spark plug 10 can be strategically adjusted given an approximate 20-30% increase in dielectric strength of the ceramic body 35 of the insulator 14. The spark plug 10 may be an M10 or M12 spark plug, such that a major diameter $D_M$ of the shell threads at the thread area 37 is 10 mm or 12 mm, respectively. Other sized spark plugs 10 can also be created in accordance with the teachings herein, but the dielectric strength benefits lend themselves particularly well to plug and engine downsizing (e.g., use of an M10 plug as compared with an M12 plug), while maintaining the requisite capacity to withstand various voltage limits. While similar high purity alumina materials have been used in the past, typically, they could not perform adequately in smaller plugs and with thinner walled insulator structures.

The insulator 14 includes a radial thickness at the gasket $T_G$ and a radial thickness at the internal seal $T_{IS}$ that are strategically reduced. The thickness at the gasket $T_G$ is the radial extent of the ceramic body 35 measured between the gasket shoulder 39 at the start of the external step portion 36 and the axial bore 22 of the insulator 14. The thickness at the internal seal $T_{IS}$ is the radial extent of the ceramic body 35 measured between the axial bore 22 at the internal seal 27 and the outer surface 23 of the insulator 14 at the internal seal. Accordingly, the thickness at the gasket $T_G$ is the radial insulator thickness at the gasket, and the thickness at the internal seal $T_{IS}$ is the radial insulator thickness at the internal seal. If there are diametric variations in the internal seal 27, the thickness $T_{IS}$ is taken at its largest extent. Typically, the area of the insulator 14 at the thickness $T_G$ experiences the highest electrical stress during service, and the thickness of the insulator at the internal seal $T_{IS}$ experiences the second highest electrical stress. Thus, controlling the thickness in these areas, while maintaining requisite dielectric strength, can help with downsizing and plug performance.

In one example, the spark plug 10 is an M12 spark plug, with a radial thickness $T_{IS}$ at the internal seal 27 of 1.5 to 1.6 mm, inclusive. This is substantially less than the standard 2.1 to 2.2 mm thickness at the internal seal 27, while maintaining or exceeding the requisite dielectric strength. Further, the thickness $T_G$ at the gasket or gasket shoulder 39 is 1.0 to 1.2 mm, inclusive. This is an approximately 30% decrease in the thickness as compared to standard plugs, while maintaining a dielectric strength of 42 kV/mm or more, or more advantageously at least 50 kV/mm up to 70 kV/mm. In another example, the spark plug 10 is an M10 spark plug, with a thickness $T_{IS}$ at the internal seal 27 of 1.4 to 1.8 mm, inclusive. Further, the thickness $T_G$ at the gasket shoulder 39 is 1.1 to 1.5 mm, inclusive. These again equate to an approximately 30% reduction in the thickness as compared to standard plugs, while maintaining a dielectric strength of 42 kV/mm or more. This level of dielectric strength was seemingly unachievable with similar high purity alumina materials, particularly given standard processing methods. With the increased dielectric durability, the thickness of the spark plug insulators 14 made in accordance with the methods described herein can be reduced, allowing equivalent performance of 50 kV of the spark plug 10 in an M10 design.

FIG. 4 includes a plot 70 showing dielectric performance of prior art insulators 72, 74 compared with insulators 76 made in accordance with the teachings herein, using the ASTM D149 test. Thirty insulators in each group were tested using a 60 Hz AC voltage source, with a cylindrical high voltage electrode in the axial bore 22 of the insulator 14 and a ground electrode sleeve around the cylindrical portion of the insulator at the internal seal 27 ($T_{IS}$). The voltage was ramped at 500 V root mean square (RMS) per second until dielectric failure of the insulator occurred. The average failure voltage was 23.4 kV (RMS) for the prior art. The minimum failure voltage for the prior art was 22.0 kV (RMS). For the insulators 76, tested under the same conditions, the average failure voltage was 34.0 kV (RMS), and the minimum failure voltage was 27.7 kV (RMS).

Various factors can impact the dielectric strength performance of the ceramic body 35, including the insulator 14 structure, as well as electrical stress concentration due to the geometry of the electrodes and the waveform of the applied voltage. The waveform of the applied voltage in the ASTM D149 test is a continuous alternating current sine wave with 60 Hz. The peak voltage of the sine wave is the RMS voltage times the square root of 2 (1.414). In contrast to the 23.4 kV RMS average failure voltage from the ASTM D149 test, spark plugs constructed using the prior art insulators and tested using an automotive ignition coil at the voltage source typically survive 50 kV or more. The wave form from the automotive ignition coils is a series of high voltage pulses that are negative with respect to ground. The high voltage pulses typically occur at about 50 to 60 Hertz, but each pulse has a duration of only milliseconds (typically less than 1 millisecond), and the pulses are separated by intervals where the applied voltage is essentially zero. Thus, higher voltages by a factor of about 2 can be withstood when the waveform of the voltage source is that of an automotive ignition coil. Therefore, it is expected that spark plugs 10 made in accordance with the teachings herein will, on average, be able to withstand more than 68.0 kV or more. Given this increase, the wall structures can be made thinner, while maintaining the requisite strength.

Having an insulator 14 with a thinner cross-section or radial thickness at the seal 27 ($T_{IS}$) or at the gasket or gasket shoulder 39 ($T_G$) can allow for the increase in thickness in other components of the spark plug 10. For example, the diameter Ds of the internal seal 27 could be proportionally increased. This could reduce the current density and make the suppressor more durable under severe engine conditions. In another example, the thickness $T_{IS}$ of the shell 16 could be increased. There is a risk with M10 plugs that making the shell 16 too thin may make the plug unsuitable, given the required torque to install and remove the plug from the engine. Reducing the radial thickness of the insulator 14 at the inner seal $T_{IS}$ and/or the radial thickness of the insulator 14 at the gasket $T_G$ could allow for a proportional increase in the shell thickness $T_S$, which can accordingly help with plug installation and/or removal. In yet another example, the diameter $D_{CE}$ of the center electrode 12 can be proportionally increased, allowing for better heat flow from the firing tip. The proportionality of these various increases/decreases in thickness or diameter will depend on a number of factors, such as the overall plug size and design, the amount of increase/decrease of each respective adjusted component, and the type of materials being used, to cite a few examples.

FIG. 5 is a table showing a comparison between six example prior art plugs (PA1-6) and eight example embodiments in accordance with the teachings herein (EX1-8), with the table including various examples for the geometrical dimensions illustrated in FIG. 1. As used herein, references to proportional increases in thickness or diameter are increases to standard sized components, having the dimensions or range of dimensions listed in FIG. 5 for PA1-6, with the standard thickness at the major diameter for M10 being 1.66 to 1.81 mm, inclusive, and for M12 being 2.17 to 2.28 mm, inclusive.

In order to achieve resistance to dielectric breakdown, a geometrical factor for the design of the insulator 14 can be defined as either or both of Equations 1 and 2 below:

$$\left(\frac{T_{IS}}{D_{CE}}\right)\left(\frac{D_S}{D_M}\right) \quad \text{(Equation 1)}$$

$$\left(\frac{T_G}{D_{CE}}\right)\left(\frac{D_S}{D_M}\right) \quad \text{(Equation 2)}$$

where the terms are defined above and shown for example in the table of FIG. 5, with $T_{IS}$ being the thickness of the ceramic at the inner seal 27, $T_G$ being the thickness of the ceramic at the gasket 40, Ds being the diameter of the inner seal, and $D_M$ being the major diameter of the threads of the shell 16 at the thread area 37.

In prior art spark plugs, the goal has generally been to maximize these geometrical factors in Equation 1 and 2 by increasing the thickness of the ceramic within the constraints of the shell 16, center electrode 12, and inner seal 27 dimensions. The spark plugs as defined herein, however, allows for the thickness of the ceramic insulator 14 to be reduced because of excellent resistance of the ceramic to dielectric breakdown. Accordingly, Equations 1 and 2 can be modified to include a factor A for the ceramic, as shown in Equations 3 and 4 below, respectively:

$$\left(\frac{T_{IS}}{D_{CE}}\right)\left(\frac{D_S}{D_M}\right)\cdot A \quad \text{(Equation 3)}$$

$$\left(\frac{T_G}{D_{cE}}\right)\left(\frac{D_s}{D_M}\right)\cdot A \quad \text{(Equation 4)}$$

The factor A has been found to be a function of the density ρ of the ceramic of the insulator 14 relative to the theoretical density of fully dense, pore free alumina $\rho_{TH}$ (e.g., 3.98 g/cm$^3$ for the high purity alumina described herein and used with the insulator 14). According to one embodiment, A can be defined as follows:

$$A = \left(\frac{\rho_{TH}}{\rho_{TH} - \rho}\right)^n \quad \text{(Equation 5)}$$

where the exponent n=0.5.

This provides the geometric factors, F1 and F2 as defined below in Equation 6 and Equation 7, respectively:

$$F1 = \left(\frac{T_{IS}}{D_{CE}}\right)\left(\frac{D_S}{D_M}\right)\left(\frac{\rho_{TH}}{\rho_{TH} - \rho}\right)^{0.5} \quad \text{(Equation 6)}$$

$$F2 = \left(\frac{T_G}{D_{CE}}\right)\left(\frac{D_S}{D_M}\right)\left(\frac{\rho_{TH}}{\rho_{TH} - \rho}\right)^{0.5} \quad \text{(Equation 7)}$$

Prior art spark plugs, for example PA1-6 in FIG. 5, typically have values for these factors F1 and F2 that are below two, whereas the ceramic of the insulators 14 in accordance with the teachings herein (e.g., EX1-8 in FIG. 5) allows either or both factor F1, F2 to be greater than two, and preferably, greater than three. These geometric relationships in particular can help maintain and possibly improve dielectric performance while downsizing the plug dimensions. In some embodiments, it is desirable to have both F1 and F2 be greater than two, and preferably, greater than three, as this can result in a smaller yet dielectrically strong insulator 14. As shown in FIG. 5, in the examples according to the teachings herein, F1 ranges between 2.95 and 4.9 for the examples (EX1-8), whereas the prior art insulators (PA1-6) had an F1 of 1.9 or worse. F2 ranges between 2.25 and 5.67 for the examples (EX1-8), whereas the prior art insulators (PA1-6) had an F2 of 1.95 or worse.

With regards to manufacturing the insulator 14 so as to achieve desirable values for F1 and/or F2 or the reduced insulator thickness areas while maintaining dielectric strength, one potential method involves injection molding the ceramic body 35. Injection molding is a net shape method so there is significantly less manufacturing waste, and the injection molding process can help eliminate certain spray-dried powder related processing defects that limit the performance of conventionally processed spark plug insulators (e.g., standard spray drying or cold isostatic pressing). With injection molding, for example, the high purity alumina material described above can be combined with sintering aids, which are dispersed in a thermoplastic organic medium such as wax. This is then pelletized to form an injection molding feedstock. The feedstock is injection molded to form an insulator preform. The preform is subjected to a debinding process to remove the thermoplastic organic medium, and then heat treated to sinter the insulator. In some embodiments, debinding may include a water-based or solvent-based extraction method or a carbon powder bed. During heat treatment, it is possible for the desired uniform grain size to be achieved when fired to a temperature between 1450° C. and 1550° C., inclusive. The insulator typically shrinks about 20% during the heat treatment process. The pore free structure can be achieved by adequately and carefully dispersing the precursor powder in the organic medium so that no bubbles are formed, and molding so as to not introduce bubbles. As opposed to press and turn methods, injection molding can produce insulators that are not axially-symmetric (e.g., dual barrel insulators). Further, there is sometimes a centering feature included near the gasket 40. This can be omitted in an injection molded design, given the tighter tolerances that are achievable.

Another potential manufacturing method involves specialized pressing of the ceramic body 35, and is illustrated schematically in the flowchart of FIG. 6. The method 100 is strategically different than other prior art pressing methods, and can help achieve the requisite thicknesses and dielectric strength described herein. The method 100 involves the step 102 of mixing alumina powder, one or more sintering aids, and fluid to form a slurry. Advantageously the alumina powder is the high purity alumina material described herein (e.g., 99.8 wt % aluminum oxide ($Al_2O_3$), with small amounts of one or more sintering aids making up the balance (e.g., magnesium oxide (MgO), yttrium oxide ($Y_2O_3$), and/or zirconium oxide ($ZrO_2$), with the alumina powder being an alkoxide derived alumina with a purity of at least 99.93 wt % aluminum oxide, and more preferably at least 99.97 wt % aluminum oxide). The fluid can be water or any other operable medium usable to form an adequate slurry.

In step 104, an organic binder is added to the slurry. The organic binder includes a polyethylene glycol (PEG) based material (e.g., 3-5% inclusive) and a small amount of polyvinyl alcohol (PVA) (e.g., less than 0.5% inclusive). In an advantageous embodiment, 5.0% of PEG-1500 and 0.25% PVA are included as the organic binder system. PEG with a molecular weight of 1500 in particular can help eliminate or reduce the porosity in the final ceramic body 35. These particular amounts of PEG and PVA can also help abate the formation of crescent-shaped voids during manufacture. In one particular embodiment, the total mix is essentially 100 kg high purity alumina, with 500 ppm sintering aids (e.g., magnesium oxide (MgO), yttrium oxide ($Y_2O_3$), and/or zirconium oxide ($ZrO_2$), with the alumina powder being an alkoxide derived alumina with a purity of at least 99.93 wt % aluminum oxide and more preferably at least 99.97 wt % aluminum oxide). Mixed into this is 5 kg PEG, 0.5 kg PVA and about 35 kg of water to produce a fluid slurry. The water would be removed during spray drying to produce 105.5 kg of granulated powder containing 100 kg alumina, 5 kg of PEG, and 0.5 kg of PVA, plus the 500 ppm sintering aids.

Step 106 involves spray drying the slurry to form a granular material. The PEG binder modification to the pressing and turning manufacture process helps to obliterate any undesired structures that can form in the granular material during spray drying. Accordingly, the inclusion of an organic binder system with 3-5% PEG-1500 can help provide a better spray drying result than other methods.

Step 108 involves pressing the granular material into a blank, and step 110 involves shaping the blank to form a spark plug insulator preform or green body. This may be accomplished, for example, by profile grinding the blank obtained in step 108. Again, the PEG binder can help during the pressing step 108, and can help form an improved microstructure in the ceramic body 35.

Step 112 involves firing the insulator preform obtained in step 110. The high density and uniform grain size can be achieved, for example, when firing to a temperature between 1450° C. and 1550° C., inclusive. The firing process can drive off the binder system and results in a fully densified, virtually pore free structure. Other post processing steps may also be included, such as further profile grinding, glazing, etc.

It should be noted that the example embodiments shown in the figures and described above is only meant to serve as one example of an insulator that is made according to the processes taught herein, as the processes may be used to make other insulator embodiments, including those that differ significantly from the insulator 14. Furthermore, spark plug 10 is not limited to the displayed embodiments and may utilize any combination of other known spark plug components, such as terminal studs, internal resistors, internal seals, various gaskets, precious metal elements, etc., to cite a few of the possibilities. Moreover, it is possible for the insulator 14 having the thicknesses and dielectric strengths cited herein to be formed by alternate methods not particularly discussed herein.

It is to be understood that the foregoing is a description of one or more preferred example embodiments. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A spark plug, comprising:

a shell having a thread area and an axial bore;

an insulator having a ceramic body and an axial bore, the insulator disposed at least partially within the axial bore of the shell, the ceramic body being made from a ceramic material;

a gasket disposed at least partially within the axial bore of the insulator;

an internal seal disposed at least partially within the axial bore of the insulator;

a center electrode disposed at least partially within the axial bore of the insulator; and a ground electrode configured to create a spark gap with the center electrode, wherein $$\left(\frac{T_{IS}}{D_{CE}}\right)\left(\frac{D_S}{D_M}\right)\left(\frac{\rho_{TH}}{\rho_{TH}-\rho}\right)^{0.5} > 2$$

or $$\left(\frac{T_G}{D_{CE}}\right)\left(\frac{D_S}{D_M}\right)\left(\frac{\rho_{TH}}{\rho_{TH}-\rho}\right)^{0.5} > 2$$

where $T_{IS}$ is a radial thickness of the insulator at the internal seal, $D_{CE}$ is a diameter of the center electrode, Ds is a diameter of the internal seal, $D_M$ is a major diameter at the thread area of the shell, $\rho_{TH}$ is a density of the ceramic material that is fully dense and pore-free, $\rho$ is a density of the ceramic material, and $T_G$ is a radial thickness of the insulator at the gasket.

2. The spark plug of claim 1, wherein the major diameter is M12, the insulator has a dielectric strength of 42 kV/mm or more and the radial thickness of the insulator at the internal seal is 1.5 to 2.26 mm, inclusive.

3. The spark plug of claim 2, wherein a reduction in the radial thickness of the insulator at the internal seal corresponds to a proportional thickness increase in a thickness of the shell at the thread area or a proportional diametric increase in a diameter of the center electrode or a diameter of the internal seal, and wherein the proportional thickness increase or the proportional diametric increase is 20-30%.

4. The spark plug of claim 2, wherein the radial thickness of the insulator at the internal seal is 1.5 to 1.6 mm, inclusive.

5. The spark plug of claim 1, wherein the major diameter is M10, the insulator has a dielectric strength of 42 kV/mm or more and the radial thickness of the insulator at the gasket is 0.6 to 1.7 mm, inclusive.

6. The spark plug of claim 5, wherein a reduction in the radial thickness of the insulator at the gasket corresponds to a proportional thickness increase in a thickness of the shell at the thread area or a proportional diametric increase in a diameter of the center electrode or a diameter of the internal seal, and wherein the proportional thickness increase or the proportional diametric increase is 20-30%.

7. The spark plug of claim 5, wherein the radial thickness of the insulator at the gasket is 0.6 to 0.9 mm, inclusive.

8. The spark plug of claim 1, wherein the radial thickness of the insulator at the internal seal is 1.5 to 1.6 mm, inclusive, and/or the radial thickness of the insulator at the gasket is 0.6 to 0.9 mm, inclusive.

9. The spark plug of claim 1, wherein the ceramic body has a single-phase crystal structure of alpha-alumina grains.

10. The spark plug of claim 1, wherein the ceramic body has less than 1% porosity by volume.

11. The spark plug of claim 1, wherein the ceramic body has a uniform average grain size that is less than 10 microns.

12. The spark plug of claim 11, wherein the ceramic body has a uniform average grain size that is less than 5 microns.

13. The spark plug of claim 1, wherein the ceramic material includes greater than 99.8 wt % alumina.

14. The spark plug of claim 13, wherein the ceramic material is derived from an alkoxide precursor alumina powder having a purity of at least 99.95 wt %.

15. The spark plug of claim 1, wherein $$\left(\frac{T_{IS}}{D_{CE}}\right)\left(\frac{D_S}{D_M}\right)\left(\frac{\rho_{TH}}{\rho_{TH}-\rho}\right)^{0.5} > 2$$

and $$\left(\frac{T_G}{D_{CE}}\right)\left(\frac{D_S}{D_M}\right)\left(\frac{\rho_{TH}}{\rho_{TH}-\rho}\right)^{0.5} > 2.$$

16. The spark plug of claim 15, wherein $$\left(\frac{T_{IS}}{D_{CE}}\right)\left(\frac{D_S}{D_M}\right)\left(\frac{\rho_{TH}}{\rho_{TH}-\rho}\right)^{0.5} > 3$$

and $$\left(\frac{T_G}{D_{CE}}\right)\left(\frac{D_S}{D_M}\right)\left(\frac{\rho_{TH}}{\rho_{TH}-\rho}\right)^{0.5} > 3.$$

17. A method of manufacturing the spark plug of claim 1, comprising the step of injection molding the ceramic body.

18. A method of manufacturing the spark plug of claim 1, comprising the steps of spray drying a slurry to form a granular material and pressing the granular material to form the ceramic body.

19. A spark plug, comprising:

a shell having an axial bore, the shell having an M12 major diameter at a thread area of the shell;

an insulator having a ceramic body and an axial bore, the insulator disposed at least partially within the axial bore of the shell;

an internal seal disposed at least partially within the axial bore of the insulator;

a center electrode disposed at least partially within the axial bore of the insulator; and a ground electrode configured to create a spark gap with the center electrode, wherein the insulator has a dielectric strength of 42 kV/mm or more and a radial thickness at the internal seal of 1.5 to 1.6 mm, inclusive.

20. A spark plug, comprising:

a shell having an axial bore, the shell having an M10 major diameter at a thread area of the shell;

an insulator having a ceramic body and an axial bore, the insulator disposed at least partially within the axial bore of the shell;

a gasket disposed at least partially within the axial bore of the shell;

a center electrode disposed at least partially within the axial bore of the insulator; and a ground electrode configured to create a spark gap with the center electrode, wherein the insulator has a dielectric strength of 42 kV/mm or more and a radial thickness at the gasket of 0.6 to 0.9 mm, inclusive.

* * * * *